May 9, 1961
D. HEYER ET AL
2,983,536
SPRING CATCH
Filed Dec. 15, 1958
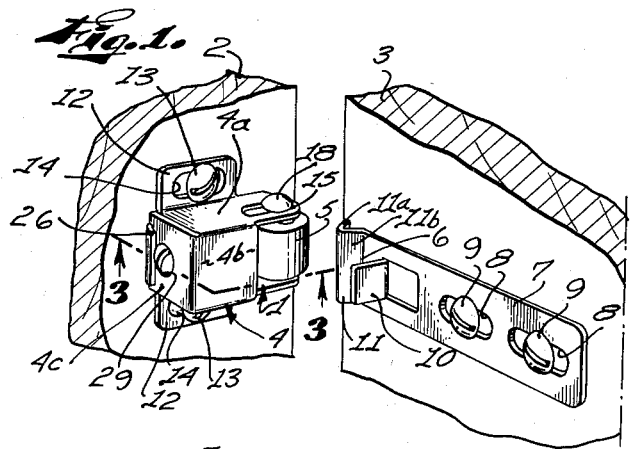
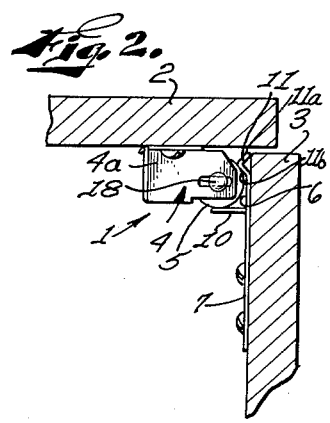
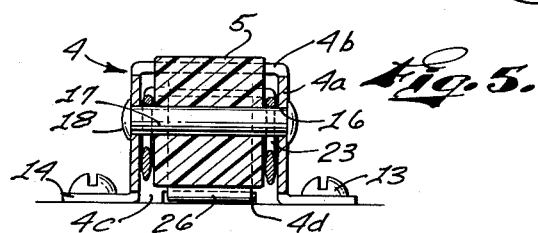
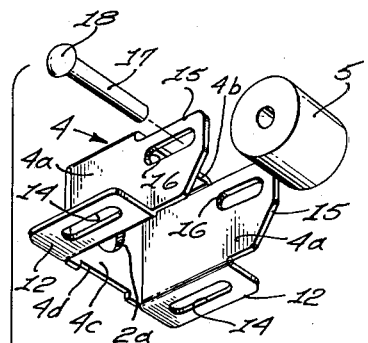
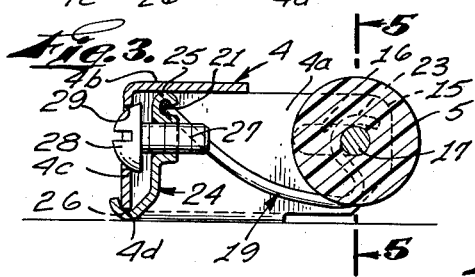
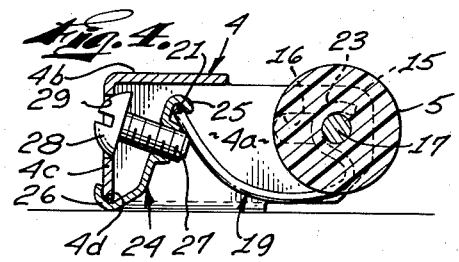
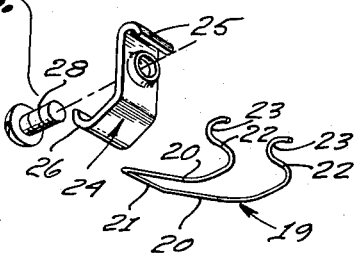
INVENTORS.
DON HEYER
JAMES W. MAIZE
BY
Paul A. Weilein
ATTORNEY

United States Patent Office 2,983,536
Patented May 9, 1961

2,983,536

SPRING CATCH

Don Heyer, El Monte, and James W. Maize, La Habra, Calif., assignors to M and H Industries, Inc., Los Angeles, Calif., a corporation of California Filed Dec. 15, 1958, Ser. No. 780,470

8 Claims. (Cl. 292—75)

The present invention relates to a spring catch device, and more particularly to a spring catch of the type wherein a holding latch element is biased towards a complemental seat therefor.

In accordance with an object of the invention, a novel spring catch device is provided, including a rolling latch element shiftably disposed in a supporting bracket for movement normal to the axis of rotation of the rolling latch element, wherein the rolling latch element is so supported and biased in a latching direction that pivotal movement or canting of the rolling latch element is permitted to compensate for angular misalignment of the rolling latch-supporting bracket and a cooperative latch plate. Such a construction enables the rolling latch element, particularly a cylindrical latch element, to maintain effective lineal contact of the rolling latch element with a lug on the latch plate, thus to substantially enhance the life and effectiveness of the device.

Pursuant to the foregoing objective, a spring catch is provided in which a pair of functionally independent spring arms are employed for biasing the rolling latch element in a latching direction. In order to facilitate manufacture and assembly, the functionally independent spring arms are structurally integral with a mounting or bridging section adapted to be anchored in the supporting bracket.

Other objects and advantages of the invention will hereinafter be described or will become apparent to those skilled in the art and the novel features thereof will be defined in the appended claims.

In the accompanying drawing:

Fig. 1 is a view in perspective illustrating the latch mechanism hereof in association with a door and a door frame of a cabinet or the like, the latch element being disengaged from the latch plate;

Fig. 2 is a view with fragments of a door and door frame shown in section, illustrating in plan the latch device of the present invention engaged with a latch plate, and with the rolling latch element seated in the latching recess of the latch plate;

Fig. 3 is a sectional view on an enlarged scale as taken on the line 3—3 of Fig. 1 through the spring loaded rolling latch device of the invention in an initial stage of assembly;

Fig. 4 is a view similar to Fig. 3, but illustrating the spring being loaded by the novel lever device of the invention;

Fig. 5 is a view in section as taken on the line 5—5 of Fig. 3; and

Fig. 6 is an exploded detail view in perspective showing the various components of the spring loaded rolling latch device hereof.

In the following description and in the accompanying drawing, like reference characters designate corresponding parts.

Referring particularly to Figs. 1 and 2, the novel spring loaded rolling latch device of the invention indicated generally at 1 is shown as being secured to the inner face of a door 2 swingable relative to a door frame 3 of a cabinet or the like. The latch device 1 comprises a sheet metal bracket generally designated at 4 having a spring biased rolling element 5 shiftably carried thereby and engageable in a recess or seat 6 of a latch plate 7.

The latch plate herein shown is more or less conventional and has a pair of elongated slots 8 adapted to accommodate screws 9 for securing the plate to the door frame 3. Struck from the body of the plate 7 is an outstanding projection 10 forming one side of the seat 6, and a stop to limit movement of the door toward the frame, while at the end of the plate 7 there is provided a triangular projection 11 having a striker section 11a and a seat section 11b, the latter being opposed to the projecting tab 10 of the plate and forming the other side of the seat 6.

The bracket 4 has a pair of ears 12 adapted to be secured as by screws 13 extending through elongated slots 14 in the ears into the door 2 of a cabinet or the like, with the roller 5 positioned to engage the striker section 11a of the projection 11 so as to be cammed inwardly of the bracket 4, as the roller 5 rides over the projection so as to load the spring means, hereinafter to be described, which will urge the roller 5 into the seat 6 between the seat section 11b of the projection 11 and the tab 10, when the door is closed as shown in Fig. 2.

It will be noted that the roller supporting bracket 4 is of the sheet metal construction having a pair of opposed side walls 4a, 4a on which the securing ears 12, 12 are formed. Bridging the side walls 4a is a transverse wall 4b rigidly interconnecting the walls 4a. Formed on the wall 4b and bent into right angular relationship to the walls 4a is a rear wall 4c of the bracket 4.

The roller 5 is disposed between a pair of ears 15 projecting from the side walls 4a and having longitudinally extended slots 16 therein, through which a pin 17 projects having a head 18 at one end. The roller 5 is supported between the ears 15 on the pin 17 which may be staked or peened over at the end opposite the head 18 so as to maintain the parts in assembly, whereby the roller 5 is shiftable towards and away from the latch plate 7 in a direction normal to the axis of rotation of the roller 5.

In order to resiliently bias the roller 5 outwardly with respect to the bracket body so as to be engageable in the complemental seat 6 as aforementioned, a generally U-shaped spring element generally designated 19 is provided.

As best seen in Fig. 5, the spring 19 has a pair of arms 20, 20 joined by a base or bridging section 21, the arms respectively terminating in substantially an S-shaped end 22 forming a hook 23 which, as best shown in Fig. 5, is adapted to engage the pin 17 at opposite ends of the roller 5. As will particularly appear hereafter, the arms are functionally independent but for facility of assembly are structurally integral with the bridging portion 21 of the spring 19.

Means are provided for anchoring the base 21 of the spring 19, and in this connection a lever, generally denoted at 24, is provided, this lever having a hooked end 25 adapted to receive the base 21 of the spring 19 and a hooked end 26 adapted to be engaged with the rear wall 4c of the bracket 4. Preferably, this rear wall 4c is notched as at 4d for the reception of the hooked end 26 of the lever 24. The lever 24 fulcrums about the end 26 thereof when engaged in the notch 4d. Threadedly carried in the lever 24 is a screw 27 having a round head 28 rotatably disposed in a socket 29 formed in the rear wall 4c of the bracket 4.

Referring to Fig. 3, it will be noted that the screw 27 is threaded substantially fully into the lever 24 and the base 21 of spring 19 is engaged in the hooked end 25 of the lever which is substantially parallel to the rear wall 4c of the bracket. Accordingly, with the lever 24 adapted to fulcrum about the hooked end 26 thereof which is engaged with the wall 4c in the notch 4d, the head 28 of the screw 27 may be engaged with a driving tool so as to rock the lever 24 in a clockwise direction to the position shown in Fig. 4, whereby the effect of spring 19 will be adjusted to vary the force urging the roller 5 in a latching direction. The spring arms 20 act independently on the roller supporting pin 17 at both sides of the roller 5. Thus, the roller is self-aligning by reason of the ability of the pin 17 to cant in the slots 16 about an axis parallel to the ears 15. Therefore, the roller is free to assume full line contact with the striker section 11a and particularly the seat section 11b of the latch plate 7.

While the specific details of the invention have been herein shown and described changes and alterations may be resorted to without departing from the spirit thereof as defined in the appended claims.

We claim:

1. In a spring loaded latch device of the class described: a bracket having opposed walls provided with elongated slots; a rolling latch element having pin supporting means projecting from opposite ends of said rolling latch element through said slots; said bracket having a rear wall; a spring having a pair of arms engaged with said pin supporting means at opposite sides of said rolling latch element; a lever engaged with said spring between said arms; means pivotally mounting said lever on said rear wall; and means engaged with said lever and said rear wall operable from the exterior of said rear wall for rocking said lever to load said spring arms; said spring urging said lever in a direction for holding said last named means against said rear wall.

2. In a spring loaded latch device of the class described: a bracket having opposed walls; a rolling latch element shiftably disposed between said walls; pin means supporting said rolling latch element and slidably mounted in said walls; spring means engaged with said pin means; said bracket having a rear wall opposite said latch element; said rear wall having a seat; and means located between said spring and rear wall and engaged therewith for securing said spring means in said bracket including a member urged against said seat by said spring means.

3. In a spring loaded latch device of the class described: a bracket having opposed walls; rolling latch means shiftably disposed between said walls; a spring engaged with said rolling latch means for urging the same in a latching direction; said bracket having a rear wall opposite said rolling latch means; means securing said spring in said bracket including a lever pivotally connected to said bracket and to said spring; and means engaged with said bracket and said lever for rocking the lever to load said spring; said rear wall having an opening opposite said lever; said last named means being disposed between said lever and said rear wall and held against said opening by said spring means.

4. In a spring loaded latch device of the class described: a bracket having opposed walls; rolling latch means shiftably disposed between said walls; a spring engaged with said rolling latch means for urging the same in a latching direction; means securing said spring in said bracket including a lever pivotally connected to said bracket and to said spring; a screw threadedly connected to said lever and rockably engaged with said bracket for rocking the lever to load said spring; said bracket having a rear wall opposite said latch means and provided with an opening opposite said lever; and a head on said screw seated in said opening.

5. In a spring loaded latch device of the class described: a bracket having opposed walls; rolling latch means shiftably disposed between said walls; a spring engaged with said rolling latch means for urging the same in a latching direction; said lever having a rear wall opposite said latch means; means securing said spring in said bracket including a lever pivotally connected to said rear wall and to said spring; a screw threadedly connected to said lever; said screw having a round head; said rear wall having on a face thereof opposite said lever a seat in which said head is rockably and rotatably seated and so held by said spring, whereby rotation of said screw will rock said lever to load said spring.

6. In a spring loaded latch device of the class described: a bracket having opposed walls; rolling latch means shiftably disposed between said walls; a spring engaged with said rolling latch means for urging the same in a latching direction; said bracket having a rear wall opposite said rolling latch means; means securing said spring in said bracket including a lever disposed between said rear wall and said spring; said lever having an end connected to said spring; the other end of said lever being pivotally connected to said rear wall; said rear wall having an opening opposite said lever; and means adjustably connected with said lever and engaged with said rear wall so as to be operable at said opening for rocking the lever to load said spring; said spring holding said lever in connected relation with said rear wall and urging said adjusting means against said rear wall.

7. In a spring loaded latch device of the class described: a bracket having opposed walls; rolling latch means shiftably disposed between said walls; a spring engaged with said rolling latch means for urging the same in a latching direction; means securing said spring in said bracket including a lever; said bracket having a wall opposite said rolling latch means; said rear wall having a notch in an edge thereof; said lever having a hooked end pivotally seating in said notch; said lever having another hooked end engaged with said spring; and means held in engagement with said rear wall and said lever by said spring and operable for rocking the lever to load said spring.

8. In a spring loaded latch device of the class described: a bracket having opposed walls; rolling latch means shiftably disposed between said walls; a spring engaged with said rolling latch means for urging the same in a latching direction; means securing said spring in said bracket including a lever; said bracket having a rear wall opposite said rolling latch means; said lever having oppositely facing hook ends embracing said rear wall and a portion of said spring, respectively; said spring supporting said lever in engagement with said rear wall; and means engaged with said rear wall and said lever operable for rocking the lever to load said spring.

References Cited in the file of this patent

UNITED STATES PATENTS

| | | |
|---|---|---|
| 2,247,618 | Moroney | July 1, 1941 |
| 2,660,464 | Rosenblum | Nov. 24, 1953 |
| 2,660,465 | Gerson | Nov. 24, 1953 |
| 2,707,120 | Loeb | Apr. 26, 1955 |
| 2,714,029 | Loeb | July 26, 1955 |
| 2,792,244 | Loeb | May 14, 1957 |

FOREIGN PATENTS

| | | |
|---|---|---|
| 700,967 | Great Britain | Aug. 18, 1952 |